Patented Oct. 2, 1923.

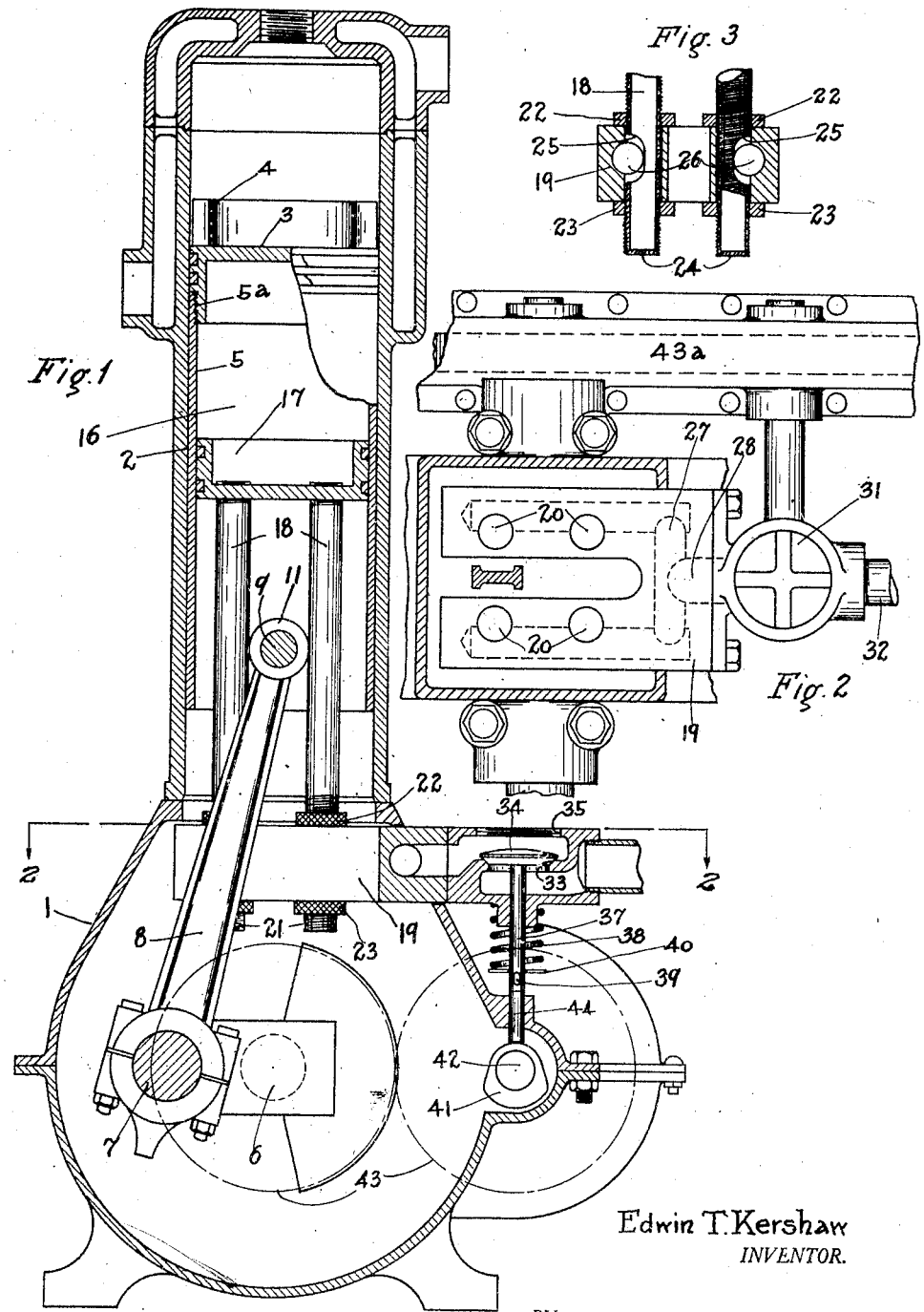

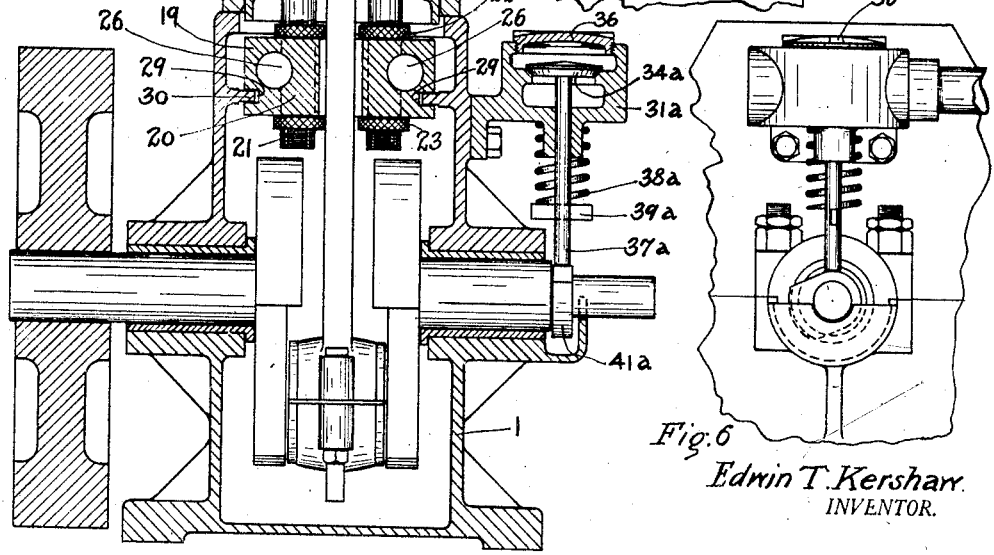

1,469,319

UNITED STATES PATENT OFFICE.

EDWIN T. KERSHAW, OF DENVER, COLORADO.

INTERNAL-COMBUSTION ENGINE.

Application filed February 4, 1922. Serial No. 534,168.

*To all whom it may concern:*

Be it known that I, EDWIN T. KERSHAW, a citizen of the United States, residing at Denver, in the county of Denver and State of Colorado, have invented certain new and useful Improvements in Internal-Combustion Engines; and I do hereby declare the following to be a full, clear, and exact description of the invention, such as will enable others skilled in the art to which it appertains to make and use the same.

This invention relates to internal combustion engines and more particularly to internal combustion engines of the two-stroke cycle type in which a charge of air and combustible gas or vapor is preliminarily compressed by the working stroke of each piston and introduced into the combustion space of the cylinder by the expansive force of the precompressed charge.

In the operation of the more usual type of two-stroke cycle, internal combustion engines combustible mixture is drawn into the crank case, by the suction of each piston on its compression stroke, and placed under moderate compression by each piston on its working stroke at the end of which an exhaust port is opened to the exterior atmosphere and a port of communication is opened between the crank case and the combustion space between the piston and cylinder head through which the preliminarily compressed charge rushes into said combustion space driving out before it through the exhaust port the previously burnt gases.

In that type of two-stroke cycle engine in which the charge is preliminarily compressed in the crank case it has proven difficult to obtain high speed and efficiency because the preliminary compression in the crank case is not high enough to cause the charge to enter with sufficient speed and energy into the combustion chamber to completely fill it with fresh mixture and completely drive out the burnt gases. Furthermore, as is well known, it is difficult to maintain a perfectly tight crank case owing to the wear of bearing bushings, packed joints and the like, so that some of the preliminary charge is apt to be forced out of the crank case during the working stroke still further weakening the compression therein and causing the engine to operate at low speed and efficiency.

In order to overcome the deficiencies due to poor preliminary compression in two cycle engines it has been proposed to preliminarily compress the charge or charges in a separate chamber or in separate chambers, according to whether the engine is provided with one or more than one cylinder and piston units. And it has also been proposed to provide these preliminary compression chambers within the skirted portion of a cup-shaped piston. To this last mentioned type of engine this invention appertains and its object is to improve the construction of engines of this type by a novel combination of means and mode of operation as more fully described hereinafter, illustrated in the drawings and defined in the appended claims.

In the accompanying drawings in which like reference characters indicate like parts throughout the several views:

Figure 1 is a vertical section through the cylinder and piston of an internal combustion engine, embodying my invention at right angles to the crank shaft;

Figure 2 is a transverse section taken on the line 2—2 of Figure 1;

Figure 3 is a vertical section through a portion of the fuel mixture intake means taken at right angles to the section thereof shown in Figure 1;

Figure 4 is a vertical section through an engine embodying my invention taken parallel with the crank shaft and showing a modified form of fuel intake means;

Figure 5 is a horizontal section taken on the line 5—5 of Figure 4;

Figure 6 is a detail view showing an elevation of the fuel intake means looking toward the left of Figure 4.

The invention may be applied to engines having one or a plurality of cylinders. It will be understood that the parts appurtenant to a single cylinder engine may be duplicated for other cylinders as is well understood.

In the drawings, numeral 1 indicates an engine crank case or base, which may be constructed in any suitable form; 2 a cylinder, mounted upon the crank case, within which a cup-shaped or skirted piston is adapted to reciprocate, said piston comprising a head 3 having on the upper surface thereof the usual baffle 4 and depending therefrom a skirt 5 which may be integral with or, as illustrated, screw-threaded to the piston head as at 5ª, and the interior of the skirt 5 is bored and ground or otherwise machined so as to present as true and smooth a surface as possible.

Journaled in the crank case is the usual crank shaft 6 provided with a crank pin (or crank pins) 7 on which is sleeved the lower end of a connecting rod 8 the upper end of which is sleeved upon a wrist pin 9 mounted diametrically in the piston skirt or sleeve 5. The wrist pin 9 may be held in oppositely disposed bosses 10 formed on the inside of the skirt 5 the ends of which are spaced from each other a sufficient distance to admit between them the upper end 11 of the connecting rod and prevent it from any considerable sidewise motion along the axis of the pin. Each cylinder is provided with the usual exhaust port 12 penetrating the wall of the cylinder at a point slightly above the lowest position of the piston head 3 and also with an inlet port 13 terminating a loop-shaped duct 14, and adapted to be uncovered by the piston at the lower end of its stroke and open communication between the combustion chamber above the piston and a preliminary charge compression chamber 16 within the cup-like piston, which latter is provided with a port 15, adapted to register with the other end of said duct 14 when the piston has descended far enough to open the port 13 into the combustion space.

The preliminary compression chamber 16 for precompressing the charge in order to confer upon it sufficient expansive energy to rush quickly into the combustion space, when the ports 15 and 13 are brought into communication, may be formed by definitely fixing within the skirt 5 of the piston a fixed abutment or head 17 in fluidtight contact with the inner smooth wall of said skirt, the piston reciprocating freely between the circumference of said abutment 17 and the inner wall of the cylinder. The said abutment 17 may be held firmly against any longitudinal movement with respect to the cylinder 2 by one or more tubes or tubular struts 18 the upper ends of which are threaded or otherwise firmly coupled to the fixed abutment 17 in such manner that the bore of said tube or tubes opens into the chamber 16 between said abutment 17 and the inner surface of the piston head 3. Each tube 18 has its lower end rigidly connected to a floating anchor and manifold member 19 which may be a bifurcated block of substantially U-form providing a space between its limbs for the movement of connecting rod 8 and disposed transversely of the axis of the piston. In the embodiment illustrated four tubes 18 are used, said tubes being preferably symmetrically spaced with respect to each other, two of them respectively entering holes 20 formed perpendicularly through each limb of said U-shaped block 19. Said tubes 18 have their lower ends threaded as at 21 and provided with adjusting nuts 22—23 adapted to clamp said tubes to the block 19 rigidly and in such manner that the said tubes may be adjusted longitudinally in said block and thus bring the abutment 17 nearer to or farther away from the block. By this means the position of said abutment 17 may be adjusted according to the exigencies of any particular situation and the capacity of the chamber 16 varied. As clearly shown in Figure 3 the lower ends of the tubes 18 are plugged or sealed as at 24 and each tube has a lateral opening as at 25, said lateral opening being elongated as shown. In communication with said lateral elongated openings in the tubes are branch ducts 26 formed, respectively, in the limbs of the anchor and manifold member 19, these branches uniting through a transverse passage 27 with the main fuel inlet duct at 28, the admission of fuel to said duct 28, being controlled by any suitable valve. The lateral elongated openings 25, it will be seen, permit of a considerable adjustment of the tubes 18 without interfering with the free passage of the fuel mixture into the preliminary compression chamber through said tubes.

The abutment or head 17 is preferably cupped on the side facing the piston head (the upper side as shown) in order to afford a bearing surface sufficiently long to avoid any binding and to provide adequate space in the preliminary charge-compression chamber, between the head 17 and the piston head, to prevent overheating by compression without the necessity of elongating the cylinder or skirt of the piston or shortening the stroke of the piston. If the head 17 were a relatively thin, solid disk of such thickness, only, to afford adequate compression space, located as indicated in the drawings, the circumferential bearing surface would be too small to satisfy the requirements of good mechanical practice; if it were made as a solid disk having adequate circumferential bearing surface, it would be necessary to elongate the piston skirt, cylinder, or both, or shorten the piston stroke, in order to provide adequate pre-compression space. An inverted cup-shaped head would be subject to the same disadvantages as the relatively thick, solid head except only with respect to the advantage of weight eliminated by the use of the former. The preferred construction of head illustrated permits the shortest possible cylinder and piston and the longest stroke consistent with a preliminary charge-compression chamber of sufficient capacity to prevent overheating of the pre-compressed charge.

The block 19 is so mounted that it may float or move freely in planes transverse of the piston axis, but may not move in a direction parallel with said axis. Although this movement may be provided for by any suitable means, in the embodiment shown ways 29 are formed in the opposite sides of the limbs of said block 19, corresponding splines 30 or the like engaging said ways being formed on the inside of the crank case, there being sufficient space in the ways with respect to the position and dimensions of the splines to allow free movement of the block 19 on said splines in any direction in a horizontal plane to a limited extent. This free movement of said block in a plane transverse to the axis of the piston allows of the head 17 maintaining always true sliding engagement with the interior of the skirt 5, the side of the head keeping always in exact parallelism therewith. Even though there may be slight inequalities in the engaging walls, the said head being floated through its rigid connection with the block 19 there can be no angular change of position of said head with respect to the axis of the cylinder and piston with the consequent tendency of said piston to bind with said head.

The construction illustrated in Figure 1 is substantially identical with that illustrated in Figure 4 with the exception of the means for mounting and operating the valve for controlling the inlet of fuel. The construction illustrated in Figures 1, 2 and 3 is more particularly adapted to multiple cylinder engines while the construction illustrated in Figures 4, 5 and 6 is more particularly adapted for a single cylinder or a two cylinder engine.

Referring now to Figures 1, 2 and 3: A fuel conduit comprises a valve box or casing 31 suitably bolted or otherwise connected to the block 19, said valve casing having a passageway connected at one end to a fuel pipe 32 and at the other end registering with the inlet duct 28 in the block 19. Between the inlet and outlet ports of said valve casing there is provided a valve seat 33 upon which a poppet valve 34 is adapted to be seated. Directly above the poppet valve there may be provided a threaded opening 35 through which the valve may be inserted into the casing, said threaded opening being adapted to be closed by any suitable cap, like the cap 36 shown in Figure 4. Said poppet valve is provided with a stem 37 projecting below the valve casing, said stem being surrounded by a coil compression spring 38 held in place by any suitable stop pin and washer 39 and 40. The said valve is adapted to be operated by a cam 41 mounted on a countershaft 42 suitably journaled in the engine base and geared to the crank shaft so as to rotate therewith at the same rate of speed. A pair of gears 43 are indicated in dotted lines in Figure 1 by means of which the shaft 42 is caused to rotate by the crank shaft. These gears may be suitably inclosed in a gear casing 43$^a$, as shown in Figure 2. Slidably mounted directly over the cam 41 is a cam-operated slide 44 adapted to register substantially with the lower end of the valve stem 37. The valve stem 37 rests freely upon said slide member 44 and is adapted to move horizontally or laterally to a limited extent with respect to the upper or free end of said slide member 44, whereby should block 19 change its position slightly during the operation of the engine owing to certain minor inequalities in the cylinder and piston or piston skirt and abutment 17, no binding of the valve stem or mis-timing of the valve results since the lower end thereof may move with freedom transversely with respect to the slide member 44. The said valve operating cam 41 must be so positioned with respect to the movements of the piston in the cylinder to which the valve controls the fuel flow that said valve will be opened during compression stroke of the piston and closed during the working stroke thereof whereby fuel may be admitted into the preliminary compression chamber during the compression stroke of the piston and compressed in the preliminary compression chamber during the working stroke.

In the construction shown in Figures 4, 5 and 6 the valve for controlling the inlet of fuel to the preliminary compression chamber is operated by a cam mounted directly upon the crank shaft of the engine. In this construction a valve 34$^a$ operates within a valve box or casing 31$^a$ which is bolted to the engine frame instead of to the block 19. The valve casing shown in Figures 4, 5 and 6 is otherwise constructed substantially the same as the valve casing shown in Figure 1. The valve 34$^a$ is provided with a valve stem 37$^a$ surrounded by a spring 38$^a$ which bears upon the bottom of the valve casing and upon a pin or other stop 39$^a$ inserted through the valve stem. In this case the lower end of the valve stem rests on the perimeter of the cam 41$^a$ mounted on the engine crank shaft. The fuel inlet pipe 32 delivers into one side of the valve casing and a flexible pipe 45 connects the opposite side of the valve casing with the fuel inlet 29 in the block 19, so that in this form as well as in the one previously described the discharge end of the conduit moves with the block 19.

The interior of the tubes 18, the communicating manifold space, the space between the abutment or head 17 and the piston head constitute, in effect, the preliminary compression chamber since the manifold and tubes referred to are always in open communication with the space between the head 17 and the inner surface of the piston head, which has been specifically designated herein as the preliminary charge-compression chamber. In fact, all of the space between the intake valve in the external fuel conduit and the inner side of the piston head, (within the walls of the manifold, tubes and skirt) are, during the operation of the engine intermittingly filled with fuel which is compressed between the valve and the piston head on the working stroke of the engine. Thus, it is apparent, adequate preliminary charge compression space can be provided without elongating the pistons and cylinders for that purpose with the result of compact engine design and efficient operation In operation, at each compression stroke of a piston the inlet poppet valve will be opened and a preliminary charge be drawn into the preliminary compression chamber. On the outward or working stroke of the piston the poppet valve closes and the preliminary charge is compressed within the chamber 16. When the inlet and exhaust ports are opened at the end of the outward stroke the burned gases pass out of the exhaust port, displaced by the strong rush of fresh fuel that has been compressed in chamber 16, and now rushes through the port 13 into the combustion space. As the abutment 17 is floated so as to move with freedom in all directions transverse of the piston axis but anchored against longitudinal movement with respect to the cylinder by reason of the manner of mounting the block 19, said abutment will accomodate itself to any inequalities and keep its position normal to its axis, thus minimizing wear and keeping a snug piston fit with the interior of the skirt. The capacity of the preliminary compression chamber may be varied so that within reasonable limits any desired compression may be obtained. If for example, the preliminary compression is found to heat the preliminary charge too high, such adjustment can be made as to reduce the degree of preliminary compression to the desired extent.

Having described my invention, what I claim and desire to secure by Letters Patent is:

1. In an internal combustion engine of the class described, a cylinder, a skirted piston, an abutment fitting within the skirted piston with respect to which said piston has a reciprocating movement, said abutment forming between it and the piston a part of a preliminary charge-compression chamber, means whereby fuel may be supplied to said chamber and admitted therefrom to the combustion space in proper sequence, and means whereby the capacity of said chamber may be varied without disturbing the adjustment of the fuel supplying means.

2. In an internal combustion engine of the class described, a cylinder, a skirted piston, an abutment fitting within the skirted piston, said abutment forming between it and the piston a part of a preliminary charge-compression chamber, means for anchoring said abutment to prevent longitudinal movement thereof with respect to the cylinder, said anchoring means comprising means capable of adjusting the position of the abutment longitudinally of the cylinder axis, and means whereby fuel may be supplied to the said chamber and admitted therefrom to the combustion space in proper sequence.

3. In an internal combustion engine of the class described, a cylinder, a skirted piston, an abutment fitting within the skirted piston, said abutment forming between it and the piston a part of preliminary charge-compression chamber, an anchoring block held against movement longitudinally of the cylinder axis, threaded members connecting the abutment to the anchoring block, adjusting nuts engaging the threaded portions of said members for holding them adjustably to the anchoring block, and means whereby fuel may be supplied to the said chamber and admitted therefrom to the combustion space in proper sequence.

4. In an internal combustion engine of the class described, a cylinder, a skirted piston, an abutment fitting within the skirted piston, said abutment forming between it and the piston a preliminary charge compressing chamber, an anchoring block held against movement longitudinally of the cylinder axis, but free to move in any direction at right angles to said axis, means for connecting the abutment rigidly to said anchoring block, and means whereby fuel may be supplied to the said chamber and admitted therefrom to the combustion space in proper sequence.

5. In an internal combustion engine of the class described, a cylinder, a skirted piston, an abutment fitting within said skirted piston, said abutment forming between it and the piston a preliminary charge compressing chamber, an anchoring block, means for holding said block against movement longitudinally of the cylinder axis, but permitting it to move in any direction at right angles to said axis, said means comprising guide members on opposite edges cooperating with guides on the engine frame, means for rigidly connecting the abutment to said anchoring block and means whereby fuel may be supplied to the said chamber and admitted to the combustion space in proper sequence.

6. In an internal combustion engine of the class described, a cylinder, a skirted piston, an abutment fitting within said skirted piston, said abutment forming between it and the piston a preliminary charge compressing chamber, an anchoring block having grooved guide ways on its opposite edges, splines on the engine frame engaging in said grooved ways, means for securing said abutment rigidly to said block, and means whereby fuel may be supplied to the said chamber and admitted therefrom to the combustion space in proper sequence.

7. In an internal combustion engine of the class described, a cylinder, a skirted piston, an abutment fitting within said skirted piston and forming a preliminary charge compressing chamber adapted to discharge into the combustion space at the end of the working stroke, a U-shaped anchoring block held against movement longitudinally of the cylinder axis, but free to move in any direction at right angles thereto, a connecting rod operating between the limbs of said block, a plurality of struts connecting said abutment rigidly with said block, and means for supplying fuel to said chamber.

8. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke; an anchoring block held against movement longitudinally of the cylinder axis, means for securing said abutment to said anchoring block comprising a tubular connection, said anchoring block having a fuel passage therein in communication with said tubular connection, and said tubular connection being in open communication with the said chamber.

9. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke, a combined anchoring block and manifold held against movement longitudinally of the cylinder axis, tubes secured to said abutment and block, said tubes being in open communication with the said chamber and with the fuel passage in said combined block and manifold.

10. In an internal combustion engine of the class described, a cylinder, a skirted piston, an abutment fitting within said skirted piston, said abutment forming a preliminary charge compressing chamber adapted to discharge into the combustion space at the end of the working stroke, an anchoring block and manifold held against movement longitudinally of the cylinder axis and having a central space, a connecting rod operating in said space, means for connecting the abutment to said anchoring block and manifold comprising tubes secured thereto upon opposite sides of said space, said tubes being in open communication with the said chamber and the fuel passage in said block and manifold.

11. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke, a combined anchoring block and manifold held against movement longitudinally of the cylinder axis, a plurality of tubes connecting said abutment with said block and manifold and serving to conduct fuel into the said chamber and to hold said abutment against movement longitudinally of the cylinder axis and also forming a continuation of said chamber.

12. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke, a combined anchoring block and manifold held against movement longitudinally of the cylinder axis, means for securing the abutment to said combined anchoring block and manifold, comprising a tube having a closed lower end extending through said block, an open upper end in communication with said chamber and a lateral opening in communication with the fuel passage in said combined block and manifold and means for longitudinally adjusting said tube in said block, said tube forming a continuation of said preliminary compression chamber.

13. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke, a combined anchoring block and manifold held against movement longitudinally of the cylinder, tubes securing said abutment to the anchoring block and manifold and constituting conduits to conduct fuel from the manifold to the said chamber, a fuel conduit leading to the last-mentioned manifold, and a valve in said conduit for controlling the passage of fuel to said chamber, said conduits forming a continuation of said preliminary compression chamber.

14. In an internal combustion engine of the class described, a cylinder, a skirted piston, an abutment fitting within said skirted piston, said abutment forming between it and the piston a preliminary charge compressing chamber adapted to discharge into the combustion space at the end of the working stroke, a combined anchoring block and manifold held against movement longitudinally of the cylinder axis, but free to move transversely thereof, said anchoring block having a fuel duct, means securing the abutment rigidly to the anchoring block comprising a tube affording a fuel passage from said duct to said chamber, a fuel conduit having its discharge end connected to said block to move therewith, and a valve for controlling the passage of fuel through said conduit, said tube and fuel conduit forming a continuation of said preliminary compression chamber.

15. In an internal combustion engine of the class described, a cylinder, a skirted piston, an abutment fitting within said skirted piston, said abutment forming between it and said piston a preliminary charge compressing chamber adapted to discharge into the combustion space at the end of the working stroke, an anchoring block held against movement longitudinally of the cylinder axis but free to move transversely thereof, said anchoring block having a fuel duct, means for securing said abutment rigidly to the anchoring block, comprising a tube affording a fuel passage from said duct to said chamber, a conduit having its discharge end connected to said block to move therewith, said conduit comprising a valve casing, a poppet valve in said casing, a stem on said poppet valve, a slide bearing against the end of said stem and means for actuating said slide at suitable intervals to admit fuel to said chamber, said duct, tube and conduit forming a continuation of the said chamber.

16. In an internal combustion engine of the class described, a base, a cylinder, a skirted piston, an abutment fitting within said skirted piston, a fuel conduit leading into the base, said fuel conduit extending into the skirted portion of the piston and being connected to the abutment so as to discharge fuel into the space between said abutment and the piston head, a fuel controlling valve in the conduit at a point removed from its connection with the abutment, and means for anchoring the abutment with respect to the cylinder so as to prevent longitudinal movement thereof during the reciprocation of the piston.

17. In an internal combustion engine of the class described, a cylinder and skirted piston forming a combustion chamber between the cylinder head and piston, an abutment fitting within the skirted piston, said abutment forming between it and the piston a preliminary charge compressing chamber, means for anchoring the abutment stationarily with respect to the cylinder, but permitting said abutment to be adjusted longitudinally of the cylinder axis, a valved fuel conduit leading into the preliminary charge compressing chamber through said abutment and constructed to be adapted to the several positions of adjustment of the abutment, and means for admitting a preliminary compressed charge of fuel from the preliminary charge compressing chamber into the combustion chamber at the end of a working stroke, said conduit forming a continuation of the preliminary charge compressing chamber.

In testimony whereof I affix my signature.

EDWIN T. KERSHAW.